Oct. 20, 1959     D. A. CUSANO     2,909,692
FIELD ENHANCED LUMINESCENCE SYSTEM
Filed June 14, 1957     2 Sheets-Sheet 1

Inventor:
Dominic A. Cusano,
by Paul A. Frank
His Attorney.

United States Patent Office 2,909,692
Patented Oct. 20, 1959

2,909,692

FIELD ENHANCED LUMINESCENCE SYSTEM

Dominic A. Cusano, Schenectady, N.Y., assignor to General Electric Company, a corporation of New York Application June 14, 1957, Serial No. 665,707

9 Claims. (Cl. 313—108)

The present invention pertains to information portraying systems, and more particularly to such systems in which information or images contained in radiant energy form are reproduced and amplified within a screen comprising a solid luminescent material. As utilized herein, the term "radiant energy" is intended to include X-rays, ultraviolet light and visible light. This application is a continuation-in-part of my copending application Serial No. 616,493, now abandoned, filed October 17, 1956, which is a continuation-in-part of application Serial No. 451,355, now abandoned, filed August 23, 1954, both of which are assigned to the present assignee.

It is well known that luminescent solids may be excited to luminescence by the incidence of radiant energy, as for example X-rays, ultraviolet light and visible light. Information systems utilizing the phenomenon of solid state luminescence under the excitation of radiant energy have not heretofore been completely satisfactory because of the difficulty in obtaining high intensity images therefrom without the use of excessively high intensity radiation. The low efficiency of luminescence obtainable from X-ray, ultraviolet and visible light stimulated solid luminescent bodies has long stood as an obstacle to the development of practical and efficient information portraying systems utilizing such light emitting solids.

This difficulty is due, in part, to the fact that, in present-day information portraying systems in which a solid body is excited to luminescence by radiant energy, the impinging radiant energy must not only carry the information to the light emitting body, but must also supply the energy to that body to cause the emission of light therefrom. Due to this mode of operation, it is impossible to obtain high brightness images from radiant energy excited luminescent materials without irradiating these materials with radiant energy of such intensity that the use of such systems is inefficient and often prohibitive. This is particularly true utilizing X-rays, in which case the permissible intensity of the rays is limited by passage through a living patient.

Accordingly, it is an object of the invention to obtain high intensity luminescent images from radiant energy irradiated luminescent solids.

A further object of the invention is to obtain high intensity visible light images from solid state luminescent materials irradiated by low intensity information containing radiant energy.

A further object of the invention is to provide information containing radiant energy irradiated information portraying systems in which a greater amount of radiant energy is obtained from the luminescent screen than is incident thereupon.

A further object of the invention is to provide a solid state light amplifier.

Still another object of the invention is to provide light amplifying systems which do not require the use of electronic tubes or evacuated envelopes.

Briefly stated, in one embodiment of my invention, a light amplifying system includes a phosphor screen comprising a continuous, homogeneous, photoelectroluminescent phosphor layer disposed between, and in contact with, two conducting electrodes, at least one of which is light transmissive. A source of unidirectional potential is applied to the two conducting electrodes and information-containing radiant energy is directed upon the photoelectroluminescent phosphor from a suitable source. When the photoelectroluminescent phosphor layer is subjected to information-containing incident radiation, and a unidirectional voltage is applied between opposite surfaces thereof, an amplified visible image is obtained by the luminescent emission thereof. Since the energy required to produce this image is derived from the unidirectional voltage source rather than from the incident radiant energy, the light emitted by the photoelectroluminescent screen contains greater energy than the radiant energy incident thereupon. Thus, true light amplification is obtained utilizing photoelectroluminescence. Photoelectroluminescence may be defined as luminescence controlled by radiation and powered by an electric field.

In accord with the invention light amplification is obtained entirely by virtue of energy changes within a solid luminescent material. No evacuated envelopes or excessively high potentials are required. Accordingly, the invention may be denominated as a solid-state light amplifier. As used herein the term "light amplifier" is used generally to indicate a device which portrays a high energy-containing visible light image in response to low-energy information impressed thereupon by radiation in the visible, ultraviolet and X-ray regions of the electromagnetic spectrum.

The novel features believed characteristic of the invention are set forth with particularity in the appended claims. The invention itself, however, both as to its organization and method of operation, together with further objects and advantages thereof, may best be understood by reference to the following description taken in connection with the attached drawings in which:

Figure 1:
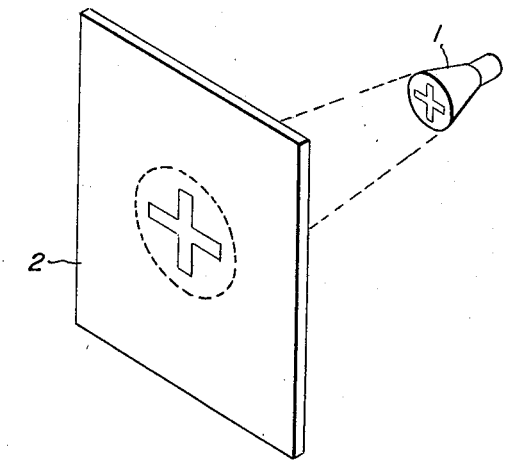
Figure 1 shows an illustrative embodiment of my invention.

In Figure 1 of the drawing a source of information containing radiant energy 1, which may project X-rays, ultraviolet or visible light, emits information containing radiation which falls upon a light amplifying screen 2 exciting the screen to luminescence causing the visible light to be emitted therefrom. Although the source 1 herein projects the information containing radiant energy, it will be appreciated that source 1 could project unmodulated radiation which is modulated by an intermediate object such as a photographic negative or the like before impinging upon screen 2.

Figure 2:
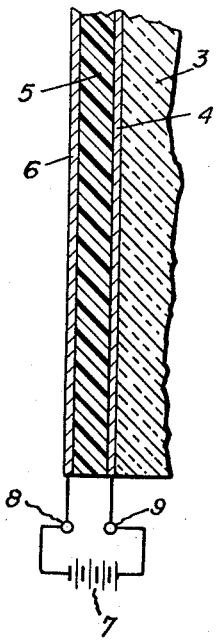
Figure 2 shows, in vertical cross-section, an enlarged sectional view of the screen of Figure 1.

Figure 2 shows in vertical cross-section, an enlarged view of a portion of screen 2 of Figure 1. Screen 2 comprises a visible light transmissive base plate 3 which may for example be of glass, mica, quartz or any other suitable visible light transmissive material, upon which the other elements of screen 2 are formed. Directly in contact with plate 3 there is located, first a visible light transmissive electrically conductive film 4, next, in direct contact with film 4, a photoelectroluminescent phosphor layer 5, and finally, in direct contact with layer 5, a thin metallic conducting layer 6. A unidirectional electric field is established across phosphor layer 5 by a source of unidirectional potential represented by battery 7, which applies a unidirectional voltage to conducting layers 6 and 4 by means of terminals 8 and 9 respectively.

Conducting layer 4 may conveniently comprise any visible-light transmissive, conducting layer such as tin oxide, but is preferably a thin layer of reduced titanium dioxide. Conducting layer 4 may be formed upon base plate 3 by the chemical reaction in a closed chamber, between titanium tetrachloride and water vapors which are brought into admixture with one another in close juxtaposition to the plate while the latter is heated to approximately 150° C. to 200° C. Film 4 may have a thickness of about .1 to 1 micron, but its thickness is not critical and may be as thin as is compatible with good electrical conductivity or as thick as is compatible with reasonable visible light transmissivity. As deposited, titanium dioxide layer 4 is not highly conductive but may be rendered conducting by the subsequent deposition thereupon of a photoelectroluminescent layer, or may be rendered conducting by the method disclosed and claimed in U.S. Patent No. 2,717,844 to L. R. Koller.

Photoelectroluminescent phosphor layer 5 may be any luminescent phosphor which exhibits the phenomenon of photoelectroluminescence. The phenomenon of photoelectroluminescence may be briefly described as that property of certain phosphors which imparts to them the ability to exhibit, under the concurrent stimulation of incident radiation and a transversely impressed unidirectional electric field, applied by electrodes in direct contact with opposite surfaces of a phosphor layer so that charge transport may occur therethrough, light emission which is of a greater intensity and contains greater energy than, the controlling radiation. The phenomenon of photoelectroluminescence, which I have discovered, derives its efficiency from the principle that the energy which is responsible for the luminescent emission from the photoelectroluminescent layer is derived from the electric field impressed upon the photoelectroluminescent layer, while light emission is initiated and controlled by the incident radiation. The incident information-containing radiation need supply only sufficient energy to the photoelectroluminescent phosphor to initiate and control photoelectroluminescent emission, and need not supply the energy required to sustain the emission. In the operation of the screens of the invention, the intensity of the incident radiation may be quite low, but nevertheless cause high intensity light to be emitted from photoelectroluminescent layer 5.

In order to describe adequately the characteristics of phosphors which exhibit the phenomenon of photoelectroluminescence, the phenomenon will be described and the characteristics necessary in order that the phenomenon exist will be set forth. Photoelectroluminescence is a process which depends for its operation upon the principle of photon multiplication within phosphor layer 5. When a photoelectroluminescent layer, such as layer 5, is in contact with a pair of conducting electrodes, one of which is preferably metallic and at least one of which is transparent to incident radiation, an electric field is established within the phosphor layer which is transverse thereto. When incident radiation falls upon the photoelectroluminescent layer, the already existing electric field existing in the vicinity of the cathode, or negatively maintained electrode, is increased due to the formation there of a space charge by radiation-freed electrons. This increased electric field in the vicinity of the cathode results in the injection of a large number of free electrons from the metallic cathode into the cathode-adjacent region of the phosphor layer. These injected electrons are then transported through the phosphor layer under the acceleration of the electric field to excite activator centers within the phosphor, causing the release of a much greater number of photons of radiant energy than are incident thereupon. Thus, in photoelectroluminescence an actual charge transport or current flow occurs through the phosphor film. This current is increased by the creation of electron avalanches by inelastic collisions as the distance from the cathode increases. Photoelectroluminescence is therefore a phenomenon involving a unidirectional current flow through the phosphor as is opposed to electroluminescence wherein luminescence is excited by an electric field alone with no unidirectional flow of current but only displacement current which ordinarily occurs in capacitors.

In order that the current flow which is required for photoelectroluminescence occur, the phosphor layer 5 must satisfy several requirements. First, in order that current flow occur, there must be direct electrical contact between phosphor layer 5 and the electrodes 4 and 6. Secondly, since photoelectroluminescence depends in part upon the creation of electron avalanches and charge transport through the phosphor, there must be a continuity of electrical properties throughout the phosphor layer. In other words, layer 5 must be composed entirely of phosphor material in an orderly crystalline array with no interstices. For this reason, conventional electroluminescent cells in which microcrystals of luminescent materials are suspended in powder dielectrics or are settled out into a heterogeneous mass by conventional liquid settling or equivalent techniques, do not exhibit photoelectroluminescence. Photoelectroluminescence may be achieved only in phosphor layers which are composed entirely of the luminescent phosphor utilized and which are homogeneous, continuous, crystalline, non-granular and exhibit uniform electrical properties throughout. If, for example, the electrical properties throughout the phosphor are not uniform, charge transport may not occur and photoelectroluminescence will not be observed.

Layers of phosphor which may be utilized in the creation of photoelectroluminescent light amplifiers in accord with the invention may be prepared by chemically reacting the vapors containing phosphor constituents and a selected activator in the vicinity of the substrate upon which the layer is formed to cause the crystallization from the vapor phase of a continuous, homogeneous, crystalline, non-granular layer composed entirely of the chosen activated phosphor. Alternatively, phosphor layers may be formed by spraying the constituent materials upon a heated substrate to cause the chemical reaction therebetween and the deposition thereupon of a uniform, crystalline, homogeneous activated phosphor layer. These methods of formation of phosphor layers are disclosed in greater detail in Patent No. 2,685,530 to Cusano and Studer. Photoelectroluminescent phosphor layers may also be formed upon a suitable substrate by vacuum evaporation techniques to cause the condensation, upon a suitable substrate, of a continuous, homogeneous, nongranular phosphor layer. In general, any method of phosphor preparation which results in the formation of a homogeneous, continuous, non-granular phosphor layer upon a suitable substrate is suitable.

The phenomenon of photoelectroluminescence has been observed with members of the zinc-cadmium sulfoselenide family including zinc sulfide, cadmium sulfide, zinc selenide, cadmium selenide, or mixtures thereof such as zinc-cadmium sulfide, zinc-cadmium selenide, cadmium sulfo-selenide, zinc-cadmium-sulfo-selenide and zinc sulfo-selenide, activated with manganese, arsenic, phosphorus or antimony and a halogen, or one of these phosphors activated with two or more of the foregoing activators and a halogen.

Figure 3:
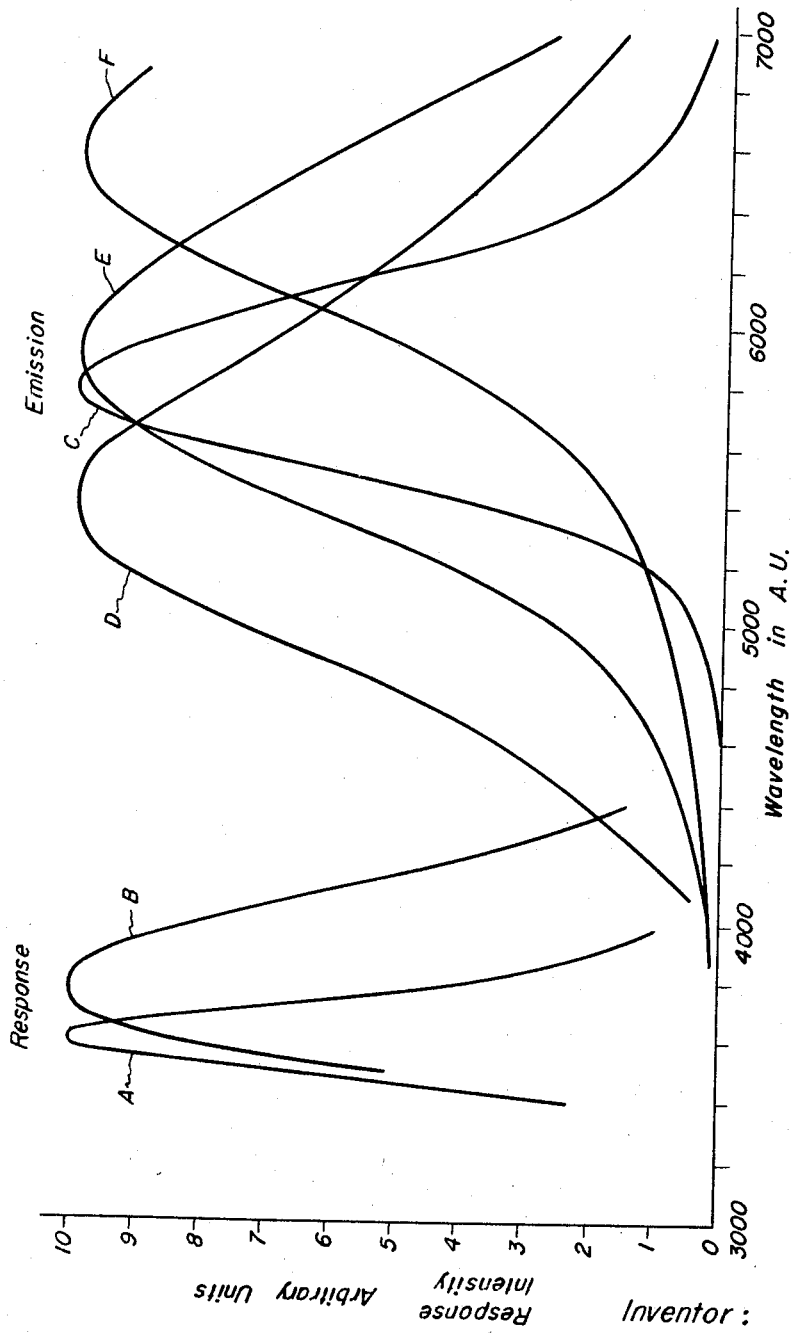
Figure 3 is a graphical representation of the response and emission spectra of certain photoelectroluminescent phosphors which may be used in constructing the screen of Figure 2.

In Figure 3 of the drawing there are illustrated the response and emission spectra of exemplary zinc sulfide photoelectroluminescent phosphors suitable for use in the photoelectroluminescent light amplifiers of the present invention activated with chlorine and manganese, phosphorus, arsenic and antimony respectively. In Figure 3, curve A represents the excitation spectra of a manganese and chlorine activated zinc sulfide phosphor utilized in the devices of the invention while curve B is a typical curve representative of the response spectra of chlorine and phosphorus, arsenic or antimony activated zinc sulfide phosphors utilized in the present invention. As may be seen from the drawing, manganese activated zinc sulfide is primarily responsive to near ultraviolet excitation whereas the phosphorus, arsenic and antimony phosphors are responsive to the near ultraviolet and the blue portion of the visible spectrum. Curves C, D, E and F of Figure 3 represent the emission spectra of zinc sulfide phosphors utilized in constructing the devices of the present invention activated with chlorine and manganese, phosphorus, arsenic and antimony respectively. While the curves of Fig. 3 are all related to zinc sulfide phosphors it should be appreciated that this phosphor is typical of all phosphors of the zinc-cadmium sulfo-selenide family and the characteristics of the other phosphors would be similar thereto. As may be seen from Figure 3, the emission spectra of these phosphors cover practically the entire visible spectrum. These phosphors, either singly or in combination may be utilized to tailor the emission spectra to practically any desired wavelength emission from the blue to the red. One advantage which may be gained by the use of doubly activated phosphors for phosphor layer 5 in the devices in the present invention is that a combination of manganese with either phosphorus, arsenic or antimony as the principal activator for the phosphor causes the emission and response spectra of the manganese activated phosphor to be broadened from their original rather narrow wavelength bands. A further unforeseen advantage which is obtained by adding either phosphorus, arsenic or antimony to a manganese activated phosphor to form phosphor layer in the devices of the present invention, is that the doubly activated phosphor including chlorine, manganese and either one or more of phosphorus, arsenic and antimony possesses an emission intensity at high intensities which is from 2 to 3 times brighter than the emission of a singly activated phosphor alone.

If manganese is utilized as the principal activator for phosphor layer 5, the manganese should be present in proportions from 0.1 to 5% by weight together with 0.1 to 5% by weight of a halogen preferably chlorine. If arsenic, phosphorus or antimony are utilized as the principal activator in the devices of the invention, these materials should be present in proportions of from 0.01 to 1% by weight of phosphorus, arsenic or antimony, together with 0.01 to 1% by weight of a halogen, preferably chlorine. While chlorine is preferably the halogen used, other halogens such as bromine and iodine may be used as well in the same proportions.

Although photoelectroluminescent phosphor layer 5 may be prepared in a number of ways, it is preferably prepared by the vapor reaction technique described and claimed in U.S. Patent No. 2,685,530 to Cusano and Studer.

As an example of this method, base plate 3, coated with a thin film 4 of titanium dioxide, is suspended in a reaction chamber and heated to a temperature of from 500° C. to 700° C. but preferably to approximately 620° C. in an evacuated reaction chamber. A charge of material comprising the phosphor cation as for example elemental zinc, a halogen containing constituent, as for example, zinc chloride, and a luminescence activator containing constituent, as for example, manganese chloride, is continuously fed into an evaporation vessel wherein the charge is vaporized. Vapors of the phosphor cation, a halogen, and a luminescence activator arise and are mixed with vapors of a gas containing the phosphor anion, as for example, hydrogen sulfide. The gas and the vapors react chemically at the surface of the heated base plate and deposit, by vapor deposition, a thin, transparent, continuous, crystalline, non-granular, photoelectroluminescent phosphor layer thereupon, which in this instance is zinc sulfide activated with manganese and chlorine (ZnS:Mn, Cl). To produce a selenide phosphor $H_2Se$ may be used.

The process of the vapor deposition of photoelectroluminescent layer 5 is carried out at a controlled rate for a preselected period of time which is selected to deposit the desired thickness layer upon base plate 3. Conveniently phosphor layer 5 may be from 1 to 25 microns thick and, for ultraviolet or visible light use, is preferably from 10 to 15 microns thick, although other thicknesses may be utilized. Specifically, if the radiation source 1 in Figure 1 of the drawing is a source of X-rays, photoelectroluminescent phosphor layer 5 may conveniently be approximately 25 to 100 microns thick. To form such a thickness layer, the vapor deposition process is, of course, carried out for a time sufficient to deposit a much thicker layer than would be deposited otherwise.

In one specific example of the formation of a photoelectroluminescent layer utilized in the invention, a Pyrex glass base plate approximately 3 inches in diameter having thereon a several tenths micron thick layer of titanium dioxide was suspended in an evacuated reaction chamber and heated by an external heater to a temperature of approximately 620° C. A flow of hydrogen sulfide into the reaction chamber was initiated to establish therein an atmosphere of hydrogen sulfide at approximately 1 millimeter of mercury pressure. A charge consisting of 25 grams of zinc, 12.5 grams of zinc chloride and 0.97 gram of manganese chloride was slowly and continuously fed into the reaction chamber and evaporated in the evaporation vessel which was maintained at a temperature of 680° C., the introduction of the charge being spaced over a period of 45 minutes. The vapors of the charge reacted with the hydrogen sulfide gas over the 45 minute period to deposit upon the titanium dioxide coated glass base plate a film of manganese and chlorine activated zinc sulfide approximately 20 microns thick.

Upon the deposition of the zinc sulfide photoelectroluminescent phosphor layer upon the glass base plate, the titanium dioxide film, which originally was non-conducting, was lowered in resistivity to a value of approximately 1000 ohms per square. This value is very small as compared with the resistivity of photoelectroluminescent phosphor layer 5, and enabled the titanium dioxide film to be utilized as an electrode as hereinbefore described.

In another specific example of the formation of a photoelectroluminescent light amplifying phosphor layer, the same apparatus as used in the previously described example was utilized, the titanium dioxide coated base plate was maintained at a temperature of 600° C. and the reaction chamber was maintained in an atmosphere of hydrogen sulfide at 600 microns pressure. A layer 20 microns thick was deposited upon a 6" diameter Pyrex glass plate by continuously feeding into the evaporation boat over a period of 45 minutes a mixture consisting of 9 grams of red phosphorus, 25 grams of zinc chloride, and 50 grams of powdered metallic zinc.

In another specific example, a 20 micron thick layer was formed upon a 6" diameter titanium dioxide coated Pyrex glass plate maintained at a temperature of 600° C., in an atmosphere of 600 microns of hydrogen sulfide while a mixture consisting of 2.25 grams of arsenic, 25 grams of zinc chloride and 50 grams of metallic zinc was fed into the evaporation boat over a period of 45 minutes.

In another specific example, a 20 micron thick layer was formed on a 6" diameter titanium dioxide coated Pyrex glass plate maintained at a temperature of 600° C. in an atmosphere of 600 microns of hydrogen sulfide gas while a mixture consisting of 4.5 grams of antimony, 25 grams of zinc chloride, and 50 grams of powdered metallic zinc was fed into the evaporation boat over a 45 minute period.

In another specific example, a 20 micron thick layer was formed upon a 6" diameter titanium dioxide coated Pyrex glass plate maintained at a temperature of 600° C. in an atmosphere of 600 microns of hydrogen sulfide gas while a mixture consisting of 0.5 gram of manganese chloride, 4.5 grams of red phosphorus, 25 grams of zinc chloride, and 50 grams of powdered metallic zinc was fed into the evaporation boat over a period of 45 minutes.

In another specific example, a 20 micron thick layer was formed upon a 6" diameter titanium dioxide coated Pyrex glass plate maintained at a temperature of 600° C. in an atmosphere of 600 microns of hydrogen sulfide while a mixture consisting of 0.5 gram of manganese chloride, 2.25 grams of arsenic, 25 grams of zinc chloride and 50 grams of powdered metallic zinc was fed into the evaporation boat over a period of 45 minutes.

In another specific example, a 20 micron thick layer was formed upon a 6" diameter titanium dioxide coated Pyrex glass plate maintained at a temperature of 600° C. in an atmosphere of 600 microns of hydrogen sulfide gas while a mixture consisting of 0.5 gram of manganese chloride, 1.15 grams of antimony, 25 grams of zinc chloride and 50 grams of powdered metallic zinc was fed into the evaporation boat over a 45 minute period.

After the deposition of phosphor layer 5, as described above, a thin coating of a suitable conducting material having a sufficiently small thickness as to be transparent to the incident irradiation, if the photoelectroluminescent phosphor is excited therethrough, but which may be opaque if the photoelectroluminescent phosphor layer is excited through conducting layer 4, is applied over the phosphor layer. Conveniently, conducting layers 6 may comprise an easily volatilizable metal, as for example, aluminum, silver or gold. When such metals are used the thickness may be approximately 0.01 micron if transparency is desired. Such metals may be deposited by well known methods, as for example by vacuum evaporation or sputtering.

Light amplifying screen 2, prepared in accord with the foregoing technique may be used in combination with a suitable source of radiation as for example X-rays, ultra-violet or visible light, to provide high intensity visible light emission with low intensity information containing radiant energy excitation. A source of unidirectional electrical potential, as for example, battery 7, is connected so as to impress an electric field across phosphor layer 5. For photoelectroluminescent emission the average field strength established within layer 5 should be approximately $10^4$ to $10^5$ volts per centimeter. Battery 7 is connected with transparent conducting film 4 positive, and metallic conducting film 6 negative. For ultraviolet and visible light operation, wherein the photoelectroluminescent film may conveniently be 10 microns thick, voltage source 7 may supply approximately 100 volts. For X-ray use wherein photoelectroluminescent layer 5 may be 100 microns thick, battery 7 may conveniently supply 1000 volts. These voltages, it will be appreciated, are much lower than the voltages necessary for electronic image intensifying devices.

Unlike electroluminescent cells which generally utilize other activators than are utilized in the photoelectroluminescent phosphor layers of the invention, and are generally of the suspended phosphor powder in dielectric type, photoelectroluminescent phosphor 5 displays only weak luminescence with the application of the electric field thereto, in the absence of incident radiation. This has been found to be true for values of field strength as high as approximately $10^5$ volts per centimeter. The same phosphor screen is brought to weak luminescence by impinging information-containing incident radiation. This luminescence, as is well known, is always of less intensity than the incident radiation. When, however, a unidirectional field of the proper polarity, as described above, is impressed upon the photoelectroluminescent phosphor layer, the brightness of the luminescent image observed is substantially increased, and has been observed to increase by a factor of approximately several orders of magnitude over the intensity of the image portrayed in the absence of the applied electric field. Additionally, and more important, the emission intensity is found to be greater than the intensity of the incident radiation by an order of magnitude or more. Thus, true radiant energy amplification is obtained.

Figure 4:
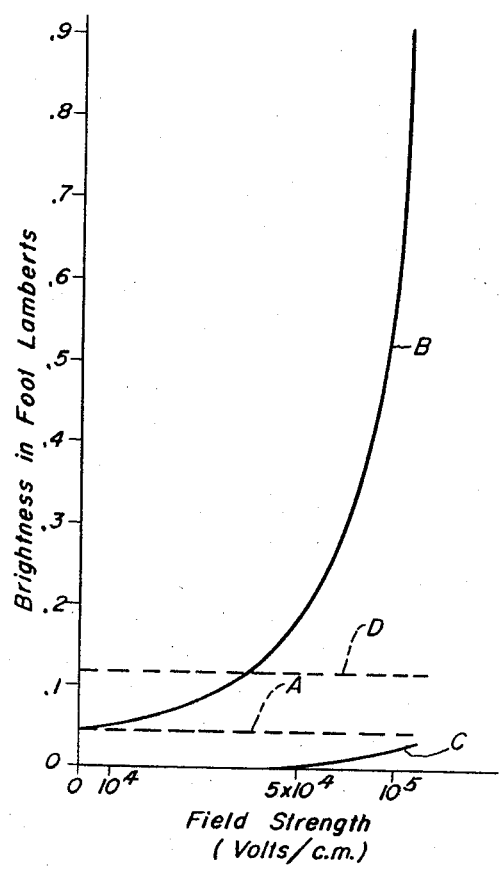
Figure 4 shows in graphical form the increase in luminous intensity which may be obtained from photoelectroluminescent light amplifying screens constructed in accord with the invention.

Figure 4 of the drawing illustrates graphically the increase of luminous intensity obtained from a light amplifying cell constructed in accord with the invention. The photoelectroluminescent film of the device tested comprised a vapor-deposited film of zinc sulfide activated with approximately 0.2 weight percent of manganese and chlorine as described hereinbefore. In Figure 4, which is a plot of brightness versus applied field, the brightness of screen 2 when irradiated by 3650 A.U. ultraviolet light, with no applied field, is represented by the level of dotted line A. Curve B represents the brightness of screen 2 under the same intensity 3650 A.U. ultraviolet radiation with increasing applied field strength. As may readily be seen from Figure 3, screen 2 is approximately 20 times brighter with an applied field of $10^5$ volts per centimeter than with no applied field. It will readily be appreciated that this increasing intensity of the emission from the light amplifying cell is not merely an electroluminescent effect, as will be appreciated from the consideration of curve C. Curve C represents the brightness versus applied field characteristic of the same device as a function of applied electric field only in the absence of ultraviolet or any other information-containing radiant energy irradiation.

An appreciation of the energy intensification or amplification derived from the system of the invention may be appreciated from a consideration of curves B and D of Figure 4. Curve D plotted against the same units as curve A represents unit recovery of incident energy when the tested device is irradiated by 3650 ultraviolet radiation. The fact that curve B for applied field strengths of greater than approximately $3 \times 10^4$ volts per centimeter greatly exceeds unit energy recovery, graphically illustrates the energy intensifying characteristics of the invention.

Photoelectroluminescent light amplification, attained in the devices of the present invention, is to be distinguished from various transient effects such as the Gudden-Pohl effect in which momentary enhancement of luminescence is attained by the application to, or removal of, an electric field from a luminescent phosphor. Such phenomena depend upon the effects of trapping of electrons at energy levels, and are transient in nature only. Photoelectroluminescence on the other hand is a steady state phenomenon which results in the continuous amplification of radiation contained information and images.

It may readily be seen, therefore, that the radiant energy amplifying screens of the invention are neither simple electroluminescent cells nor simple photoluminescent screens, but rather, are screens which receive and amplify radiant-energy-conveyed information when concurrently subjected to such radiation and to an applied unidirectional electric field. As mentioned hereinbefore since the applied electric field supplies the energy to produce luminescence, and the incident radiation triggers and controls this luminescence, a much greater amount of energy is derived from the screens than is incident thereupon in the incident radiation.

While I have described above certain specific embodiments of my invention, many modifications and changes will immediately occur to those skilled in the art. It will be appreciated, therefore, that by the appended claims I intend to cover all such modifications and changes as fall within the true spirit and the scope of the foregoing disclosure.

What I claim as new and desire to secure by Letters Patent of the United States is:

1. A radiant energy intensification system comprising a radiant energy responsive luminescent screen which emits light when subjected to radiant energy and comprising a continuous, crystalline, homogeneous, non-granular photoelectroluminescent phosphor layer, means directing information-containing radiant energy upon one surface of said layer and means in direct contact with opposite surfaces of said layer impressing a unidirectional electrical field transversely across said layer.

2. A radiant energy intensification system comprising a luminescent screen which emits visible light when subjected to radiant energy and comprising a continuous, crystalline, homogeneous, non-granular photoelectroluminescent phosphor layer, a transparent conducting film contacting one surface of said layer, a thin metallic conducting film contacting the opposite surface of said layer, means directing information-containing radiant energy through one of said films and upon said layer, and means applying a unidirectional electrical voltage between said conducting films.

3. A radiant energy intensification screen comprising a continuous, crystalline, homogeneous, non-granular photoelectroluminescent phosphor layer adapted to be directly excited to luminescence by information-containing radiant energy impinging thereon, a thin electrically conductive film which is transparent to incident radiation to which said layer is responsive contacting one surface of said phosphor layer, a thin electrically conductive film which is transparent to light emitted by said phosphor layer when excited contacting the opposite surface of said layer and means applying a unidirectional voltage between said conducting films.

4. A radiant energy intensification system comprising a luminescent screen which emits visible light when subjected to information-containing radiant energy and comprising a continuous, crystalline, homogeneous, non-granular photoelectroluminescent phosphor layer composed of a material selected from a group consisting of zinc sulfide, cadmium sulfide, zinc selenide, cadmium selenide and mixtures thereof activated with a halogen and a material selected from the group consisting of manganese, arsenic, phosphorus, antimony and mixtures thereof, a transparent conducting film contacting one surface of said layer, a thin metallic conducting film contacting the opposite surface of said layer, means directing information-containing radiant energy through one of said films and upon said phosphor layer, and means applying a unidirectional voltage between said transparent film and said metallic film.

5. A radiant energy intensification system comprising a luminescent screen which emits visible light when subjected to information-containing radiant energy and comprising a continuous, crystalline, homogeneous, non-granular photoelectroluminescent layer composed of a material selected from the group consisting of zinc sulfide, zinc selenide, cadmium sulfide, cadmium selenide and mixtures thereof activated with a quantity of activator selected from the group consisting of (1) 0.1 to 5% by weight each of manganese and a halogen, (2) 0.01 to 1% by weight each of arsenic and a halogen, (3) 0.01 to 1% by weight each of phosphorus and a halogen, (4) 0.01 to 1% by weight each of antimony and a halogen, a transparent conducting film contacting one surface of said layer, a thin metallic conducting film contacting the opposite surface of said layer, means directing information-containing radiant energy through one of said conducting films and upon said phosphor layer, and means applying a unidirectional voltage between said conducting films.

6. A radiant energy intensification system comprising an X-ray sensitive luminescent screen comprising a continuous, crystalline, homogeneous, non-granular photoelectroluminescent phosphor layer, a transparent conducting film contacting one surface of said layer, a thin metallic conducting film contacting the opposite surface of said layer, means directing information-containing X-rays through one of said films and upon said layer, and means applying a unidirectional voltage between said films.

7. A radiant energy intensification system comprising an X-ray sensitive luminescent screen comprising a continuous, crystalline, homogeneous, non-granular photoelectroluminescent phosphor layer comprising a material selected from the group consisting of zinc sulfide, cadmium sulfide, zinc selenide, and cadmium selenide activated with a quantity of activator selected from the group consisting of (1) 0.1 to 5% by weight each of manganese and a halogen, (2) 0.01 to 1% by weight each of arsenic and a halogen, (3) 0.01 to 1% by weight each of phosphorous and a halogen, (4) 0.01 to 1% by weight each of antimony and a halogen, said layer being approximately 25 to 100 microns thick, means directing information-containing X-rays upon said layer, and means applying a unidirectional voltage between opposite surfaces of said layer and comprising electrically conductive layers in direct contact with opposite surfaces of said layer.

8. A radiant energy intensification system comprising a luminescent screen which emits visible light when irradiated by information-containing radiation selected from the group consisting of ultraviolet and visible light and comprising a continuous, crystalline, homogeneous, non-granular photoelectroluminescent phosphor layer, a transparent conducting film contacting the opposite surface of said layer, means directing information-containing radiation selected from the group consisting of ultraviolet and visible light through one of said films and upon said layer, and means applying a unidirectional voltage between said films.

9. A radiant energy intensification system comprising a luminescent screen sensitive to information-containing ultraviolet and visible light and comprising a continuous, crystalline, homogeneous, non-granular phosphor film composed of a material selected from the group consisting of zinc sulfide, cadmium sulfide, zinc selenide, cadmium selenide and mixtures thereof activated with a quantity of activator materials selected from the group consisting of (1) 0.1 to 5% by weight each of manganese and a halogen, (2) 0.01 to 1% by weight each of arsenic and a halogen, (3) 0.01 to 1% by weight each of phosphorus and a halogen, (4) 0.01 to 1% by weight each of antimony and a halogen, said layer being from 1 to 25 microns thick, means directing information-containing radiant energy selected from the group consisting of ultraviolet light and visible light upon said layer and means applying a unidirectional voltage between electrically conductive layers in direct contact with opposite surfaces of said film.

References Cited in the file of this patent

UNITED STATES PATENTS 2,802,792    Butler et al. _____ Aug. 13, 1957

FOREIGN PATENTS 157,101    Australia _____ June 16, 1954